William M. Wareham INVENTOR.

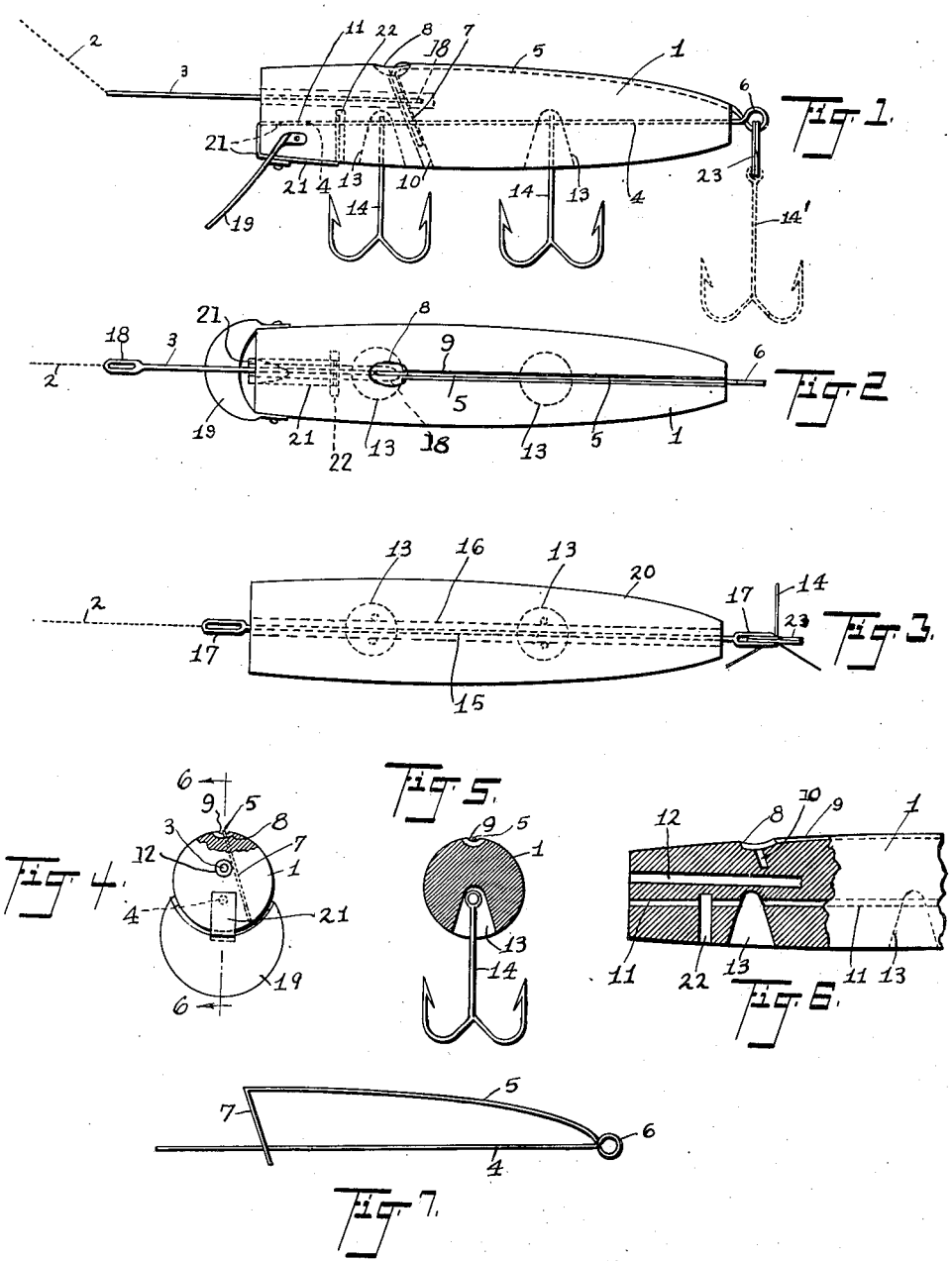

BY N. S. Armstutz
Attorney

Patented May 27, 1941

2,243,663

UNITED STATES PATENT OFFICE 2,243,663

FLOATABLE FISHING BAIT

William M. Wareham, Valparaiso, Ind.

Application April 19, 1940, Serial No. 330,571

8 Claims. (Cl. 43—46)

My invention relates to improvements in floatable fishing baits and it more especially consists of the features pointed out in the annexed claims.

The purpose of my invention is to provide a fishing bait that will float; that can be used for a variety of different combinations suited to the personal desires of every fisherman; that can be combined with all sorts of accessories some of which delight the heart of a follower of Isaac Walton; and that by reason of this adaptability will enable a fisherman to modify his set-up according to the needs that may arise when he is actually on the fishing ground. He simply uses conventional accessories and uses the one floatable body to be adaptable to any desired combinations.

With these and other ends in view I illustrate in the accompanying drawings such instances of adaptation as will disclose the broad idea of the invention without limiting myself to the specific details shown thereon and described herein.

Fig. 1 is a side elevation of an assembled bait.

Fig. 2 is a top plan of Fig. 1.

Fig. 3 is a top plan of a modified form of body.

Fig. 4 is a front elevation of Fig. 1.

Fig. 5 is a transverse section on line 5—5 of Figs. 1 and 8.

Fig. 6 is an elevation in section of the front end of the body, the section being on the line 6—6 of Fig. 4, all parts attached to the body being removed.

Fig. 7 is a detached elevation of an assembly spring.

Figure 8:
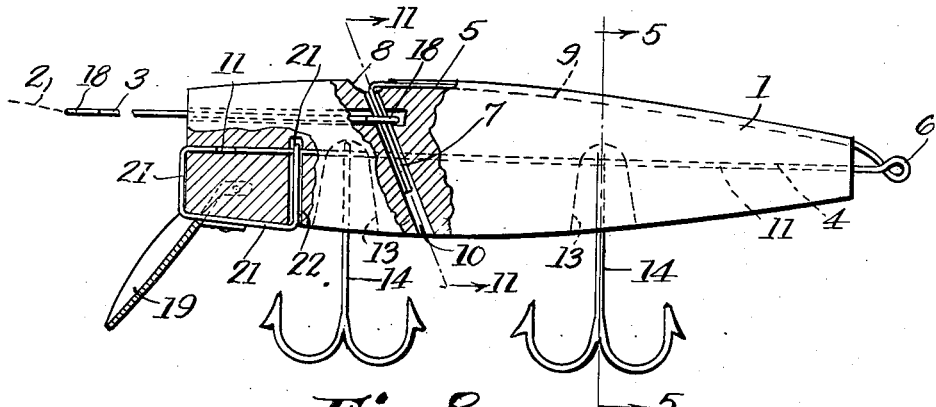
Fig. 8 is a side elevation partly in section similar to Fig. 1.
Figure 9:
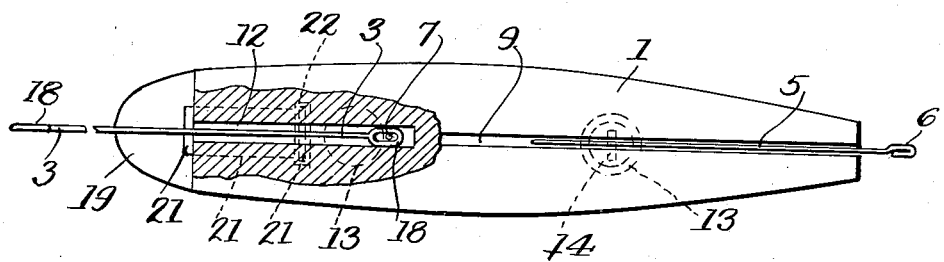
Fig. 9 is a top plan view of Fig. 8.
Figure 10:
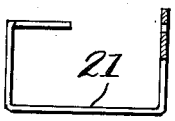
Fig. 10 is a detached side elevation, partly in section, of a diving plate.
Figure 11:
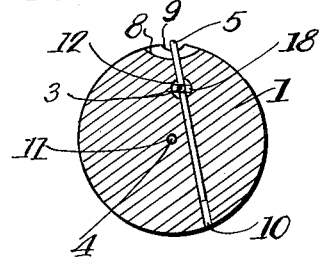
Fig. 11 is a cross section of Fig. 8 on line 11—11.

In the use of my device I may employ whatever alternative or equivalent elements that the exigencies of varying conditions may require without departing from the broad spirit of the invention.

I make use of a floating body 1 which may be formed of wood or any cooperative kind of plastics or other material. The fishing line 2 is attached to the body by a wire length 3 which has flattened eyes 18 at each end. I combine with the body an assembly spring which has a straight portion 4, a curved portion 5, and an angling strain "hook" 7. At the junction of the straight portion 4 and the curved portion 5 any kind of any eye 6 may be formed. The assembly spring is removably mounted in the body as follows: the straight portion 4 passes through the greater portion a hole 11 that extends throughout the length of the body. The portion 5 rests in a groove 9 formed on the upper side of the body, and the angling portion 7 passes through a diagonal hole 10. In passing through this hole it passes through an eye 18 of the link 3. At the forward termination of the groove 9 there is a finger recess 8. As shown in the drawings, hooks 14 are assembled on the straight portion 4 of the spring. The diving plate 19 has a fastening plate 21, the inner end of which is bent and passes upward into a slot 22 where the wire 4 passes through an eye in such extension as shown in Fig. 1. The front end of the fastening plate 21 is also bent upward and rearward terminating in the hole 11 ahead of the front end of the spring 4. This portion of the plate 21 is narrowed enough for a short distance to enter the hole 11 at its front end.

The hooks 14 are supported on the spring 4 while they are positioned in the conical recesses 13. The wire 4 is passed into the opening 11, successively through the eyes of the hooks 14. The front end of the spring 4 after passing the second hook 14 also passes into a conventional opening formed in the upturned end of the fastening plate 21 positioned in the recess 22. A flattened eye 18 of the link 3 passes through an opening 12 large enough to receive the eye, which is inserted in the opening at the time that the angular bend 7 of the spring is inserted in the opening 10.

A modification of Figs. 1 and 2 is shown in Fig. 3, wherein a straight opening 16 is formed throughout the length of the body, and in it there is a straight-away pull link 15 provided with flattened eyes 17 at each end assembled in the modified body 20. Any desired number of recesses 13 may be formed as in Figs. 1 and 2 to accommodate different types of hooks. If desired the diving plate 19 may also be applied to the modified body 20 by making a hole and a slot in it similar to Fig. 1. Hooks or other accessories may be attached to the eyes 6 and 17 by split conventional rings 23.

From the description and the drawing it will be apparent that any desired form of accessories may be combined according to the personal predilections of the fisherman. Any kind of spinner may be attached to the eye 6 or pork rind, or any kind of fancy lures. The bait under certain combinations of accessory may be used as a top water bait or lure or a medium depth lure or wobbler, or a deep water bait. No permanent fastenings are needed. The device is cheap to construct and is easy to store in tackle boxes without the boxes being cluttered up with five or six different kinds of floating bodies, having accessories permanently secured thereto.

To recapitulate, the device makes every fisherman independent of the usual conventional limitations, by giving him choice of hook sizes, number of hooks, flies, spinners, pork rind and use of the depth plate or spoon for changing the floating body from top water use to an underwater purpose, carrying but a few hooks and attachments as extras.

There is a further advantage in that the inevitable tangling of permanently attached hooks, spinners, diving plates, etc., is entirely avoided, because the fisherman can make up whatever combination he desires directly at the fishing grounds. The accessories are easily kept separate in the tackle boxes.

What I claim is:

1. A floatable fishing lure which comprises a body, said body having a lengthwise opening, an opening transverse of said lengthwise opening, a lengthwise exterior groove, and a plurality of recesses on its underside and extending across said lengthwise opening, an assembly spring, said spring having a straight portion, a curved portion, and a portion arranged at an acute angle with said curved portion, said curved portion lying in said groove, and said angularly arranged portion passing into said transverse opening, a line link extending into said body and connected to said angular portion of said spring, and accessories detachably secured to said spring.

2. A floatable fishing lure comprising a body having an approximately central opening throughout the entire length thereof and a short opening adjacent said central opening, a single line wire in said short opening, an eye at each end of the line wire, a line attached to the outer end of said wire, an instantly attachable and detachable single assembly spring in the central opening, said spring having an acute angle bend adapted to receive the inner end of the line wire and receive the strain of the line and prevent the withdrawal of the assembly spring under such strain, a plurality of recesses formed in the body and terminating across the said central opening, and selected accessories positioned in said recesses and supported on the assembly spring, whereby the lure may be changed at will into any desired combination of conventional fishing accessories.

3. In assemblable and disassemblable fishing baits, a floatable body, a supporting spring that is instantly attachable to and detachable from the body, said spring comprising a relatively straight end portion, a curved intermediate portion, and a second end portion, both end portions terminating within the body near its front end, said supporting spring having a line attached to said second end portion, different fishing accessories supported in an attachable and detachable manner for free movement on the said spring.

4. A floatable lure comprising a body having a continuous lengthwise opening therethrough, an opening near the front end of the body at an angle to the first-named opening, a short opening above the lengthwise opening and parallel thereto, and a groove on the exterior surface of the body, said groove leading to the angular opening and the beginning of the short opening.

5. A fishing device comprising a floatable body, said body having a lengthwise opening and a diagonal opening therein, a line link, an assembly wire, said assembly wire having a straight portion, a curved portion, and a short portion extending at an acute angle with the curved portion, said straight portion extending through said lengthwise opening in the body and said short portion extending into said diagonal opening in the body, said link having an eye through which the short portion of the assembly wire passes, whereby the line link is securely held under the heaviest strains that the line may be subjected to.

6. A fish lure comprising a body, said body having a lengthwise opening extending from one end thereof to the other end, a short lengthwise opening near its front end, and a transverse opening near its front end, a detachable supporting means, said means having a portion thereof extending at an angle to a second portion thereof, said first-named portion of said supporting means being positioned in said transverse opening, a fishing line link positioned in said short lengthwise opening, said link being attached to said first-named portion of said supporting means, said body having recesses therein, said supporting means having a straight portion, said straight portion passing through said recesses, and fishing accessories assembled on said straight portion of said supporting means, whereby a fisherman can make up his own combination of accessories.

7. A fishing lure which comprises a floatable body, said body having a long opening extending throughout the major length thereof, a transverse angular opening, and a short lengthwise opening extending from the front end of the body to said transverse angular opening, and said body having recesses which extend across said long opening, a detachable supporting means comprising a straight portion, a curved portion, and an acute-angled portion, said supporting means being assembled on the body so that the straight portion extends through said long opening and across said recesses, the curved portion extends along the exterior surface of the body, and the acute-angled portion extends into said transverse angular opening, a fishing line link in said short lengthwise opening, said link being attached to said acute-angled portion of said supporting means, and a plurality of fishing accessories supported on said straight portion of said supporting means and freely movable thereon and in said recesses.

8. A fishing bait comprising a floatable body, having a lengthwise opening extending entirely therethrough, a transverse opening, and a plurality of recesses extending across said lengthwise opening, a supporting spring having a straight portion, a curved portion, and an angular portion, said straight portion extending through said lengthwise opening, said curved portion being external of the body, and said angular portion extending into said transverse opening, a diving plate and other accessories supported on said spring for instant removal or attachment by shifting the straight portion of said spring in the lengthwise opening, said angular portion of said spring being adapted to enter said transverse opening to hold the spring in place, and a line attachment secured in an attachable and detachable manner to the angular portion of said spring.

WILLIAM M. WAREHAM.